United States Patent
Grizon et al.

(10) Patent No.: US 6,374,201 B1
(45) Date of Patent: Apr. 16, 2002

(54) METHOD FOR 3D MODELLING OF THE IMPEDANCE OF A HETEROGENEOUS MEDIUM

(75) Inventors: Laurent Grizon, Carrières sur Seine; Michel Leger, Rueil-Malmaison; Vincent Richard, Paris; Frédéric Dumont, Sartrouville; Pierre-Yves Dequirez, Voisins le Bretonneux, all of (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/108,974

(22) Filed: Jul. 2, 1998

(30) Foreign Application Priority Data

Jul. 4, 1997 (FR) .............................. 97 08512

(51) Int. Cl.$^7$ .......................... G06F 7/60; G06F 17/10; G06G 7/48
(52) U.S. Cl. ................. 703/10; 703/2; 703/7
(58) Field of Search ......................... 703/10

(56) References Cited

U.S. PATENT DOCUMENTS

| | | | | |
|---|---|---|---|---|
| 4,679,174 A | * | 7/1987 | Gelfand | 367/73 |
| 4,972,383 A | * | 11/1990 | Lailly | 367/73 |
| 5,113,192 A | | 5/1992 | Thomas | 342/22 |
| 5,321,613 A | * | 6/1994 | Porter et al. | 702/1 |
| 5,583,825 A | * | 12/1996 | Carrazzone et al. | 367/31 |
| 5,764,515 A | * | 6/1998 | Guerillot et al. | 702/2 |
| 5,798,982 A | * | 8/1998 | He et al. | 367/73 |
| 5,838,634 A | * | 11/1998 | Jones et al. | 367/73 |

FOREIGN PATENT DOCUMENTS

| | | | | |
|---|---|---|---|---|
| WO | 9741456 | | 11/1997 | G01V/1/03 |
| WO | WO 97/41456 | * | 11/1997 | |

OTHER PUBLICATIONS

Brac et al.; "Inversion with a priori information: an approach to integrated stratigraphic interpretation"; in "Reservoir Geophysics", ed., Sheriff, Society of Exploration Geophysicists; pp. 251–258; 1992.*

Dequirez et al.; "Accurate impedance mapping from 3D seismic data with an integrated methodology"; EAEG/EAPG/EAGO Mutlip. Workshop Developing new Reservoirs in Europe; pp. 50–53; Sep. 1994.*

Adhikary et al.; "Numerical modeling of the flexural deformation of foliated rock slopes"; Int. J. Rock Mech. and Mining Sci. & Geomech. Abs.; pp. 595–606, Sep. 1996.*

G.J.M. Lortzer et al, entitled "An Integrated Apporach to Lithologic Inversion—Part I", appearing in *Geophysics*, vol. 57, No. 2, Feb. 1, 1992, pp. 233–244, XP000330780.

* cited by examiner

Primary Examiner—Kevin J. Teska
Assistant Examiner—Hugh Jones
(74) Attorney, Agent, or Firm—Antonelli, Terry, Stout & Kraus, LLP

(57) ABSTRACT

A method for 3D modeling of the impedance of a heterogeneous medium from recorded data corresponding to waves coming from the heterogeneous medium (such as a subsoil zone), in response to (for example elastic or electromagnetic) waves transmitted therein, and from an a priori 3D model of this heterogeneous medium, knowing the position of various impedance discontinuities of the medium, and after stratigraphic interpretation is disclose. The method comprises constructing a 3D geometric model comprising several foliated volumes (such as sedimentary units foliated by the deposition isochrones) with definition of the different sheets, constructing an a priori impedance model from this geometric model and from a plurality of impedance measurements taken at various depths of the heterogeneous medium (in a well for example), selecting a covariance model (exponential for example) along the sheets of the foliated volumes, and forming the optimum model by recorded data inversion using the a priori impedance model. The method can be used notably for studying the configuration of hydrocarbon reservoirs for example.

12 Claims, 5 Drawing Sheets

METHOD FOR 3D MODELLING OF THE IMPEDANCE OF A HETEROGENEOUS MEDIUM

FIELD OF THE INVENTION

The present invention relates to a method for 3D modelling of the impedance of a heterogeneous medium from waves reflected by the discontinuities of the medium, in response to waves emitted in the medium. The waves used can be elastic waves emitted by a seismic source etc.

DESCRIPTION OF THE PRIOR ART

Various well-known approaches for converting seismic data into acoustic impedances differ in the method of parameterization of the impedance model, in the definition of objective functions and in the possibility of introducing a priori information. Parameterization can be concise, the impedance being constant or linear in a vertical direction in a certain number of layers of unknown geometry. The unknown parameters are here the acoustic impedances as well as the locations and the number of interfaces.

A method for modelling a physical parameter such as the acoustic impedance of a heterogeneous medium is described for example in the assignee's patent EP-0,354,112.

Parameterization can also be denser, the impedance field being discretized by using a 3D grid pattern. The seismic objective function consists of a norm of a well-known type $L^1$ for example or $L^2$ of the difference between the synthetic data and the observed data. The synthetic data result from the convolution of a given optimum wavelet, calibrated at the well locations with the series of reflection coefficients calculated from the impedance log. The quantity concerned in the geological objective function can be the impedance itself or some of the derivatives thereof, especially in the direction of the layers. The types of constraints applied to these quantities can be a norm of type $L^1$ or the square of a norm $L^2$ of the difference between the optimum model and the a priori model, and of the equalities or inequalities between the quantity sought and known numerical values. The most commonly used optimization methods are the conjugate gradient methods or techniques referred to as "simulated annealing" techniques.

It is well-known from Brac J. et al: "Inversion with A Priori Information: an Approach to Integrated Stratigraphic Interpretation", in Sheriff R. E. Ed., Reservoir Geophysics, Soc. Expl. Geophys., Investigations in Geophysics 7, to choose as the geological objective function the square of the norm $L^2$ of the impedance difference and of the impedance gradient difference, after projection onto the direction of dip in the vertical plane of the seismic lines. Inversion of a 3D block thus consists in several multitrace 2D inversions applied seismic line after seismic line, even if the a priori model is three-dimensional.

The reliability and the accuracy of reservoir models depend on the degree of integration between the seismic and the geologic data. A realistic reservoir model must combine, at the earliest possible stage of the implementation process, relatively accurate poststack seismic data, laterally few but vertically accurate well logging data, as well as interpretative data provided by a regional geological survey. Poststack stratigraphic inversion is a significant step for the integration of geosciences.

SUMMARY OF THE INVENTION

In the description hereafter, the general term "foliated" volume or volume provided with a "foliation", used to define the medium to be modelled, is taken in its geometrical meaning. It is a volume consisting of a set of contiguous and disjointed sheets or surfaces whose gathering forms the volume.

The method according to the invention finds applications notably for subsoil surveys for example in hydrocarbon reservoir prospecting.

The of the method according to the invention determines a three-dimensional (3D) optimum model of the impedance of a heterogeneous medium from recorded data corresponding to waves coming from the heterogeneous medium, in response to waves that are transmitted therein and from a 3D a priori model of this heterogeneous medium, knowing the position of different impedance discontinuities of the medium, and after stratigraphic interpretation.

The method is characterized, in the most general definition thereof, in that it comprises in combination
  constructing a 3D geometric model of the heterogeneous medium, comprising several foliated volumes (provided with a foliation) with definition (positioning) of the various sheets thereof,
  constructing an a priori impedance model from this geometric model and from a plurality of impedance measurements taken at various depths of the heterogeneous medium,
  selecting a covariance model alone the sheets of said foliations, and
  forming the optimum model by recorded data inversion using the a priori impedance model.

The method can be used notably to obtain a 3D optimum model of the impedance of a subsoil zone, the various foliated volumes being in this case sedimentary units, the impedance measurements being obtained at various depths of at least one well through the zone, and the sheets of the various foliated volumes consisting of deposition isochrones in each of these sedimentary units.

The a priori impedance model can be formed for example by simple interpolation or by kriging, along deposition isochrones, of the impedance values known for the well(s).

The recorded data can be obtained for example from elastic waves (P or S waves) or electromagnetic waves.

According to a preferred embodiment, an isotropic or anisotropic 2D exponential covariance model is preferably selected.

Formation of the optimum model can be obtained for example by determining, on the entire 3D model, the minimum of a global objective function comprising a term relative to the recorded data, consisting of the square of the norm $L^2$ of the difference between synthetic data and the recorded data, and an impedance term consisting on the one hand of the square of the norm $L^2$ of the impedance difference and, on the other hand, of the square of the norm $L^2$ of the impedance difference gradient, after projection of this gradient onto the plane tangent to a local sheet of the foliated volumes (a dip plane in the case of a subsoil zone for example).

The method according to the invention is a flexible approach for estimating impedances in the frequency band used, constrained by the recorded 3D data, the impedance logs (measured in the wells for example) and the known information concerning the medium (geologic data, stratigraphic and structural as well for example).

BRIEF DESCRIPTION OF THE DRAWINGS

Other features and advantages of the method according to the invention will be clear from reading the description hereafter of a non limitative embodiment example, with reference to the accompanying drawings wherein.

DETAILED DESCRIPTION OF THE PREFERRED EMBODIMENTS OF THE INVENTION

Figure 1A:
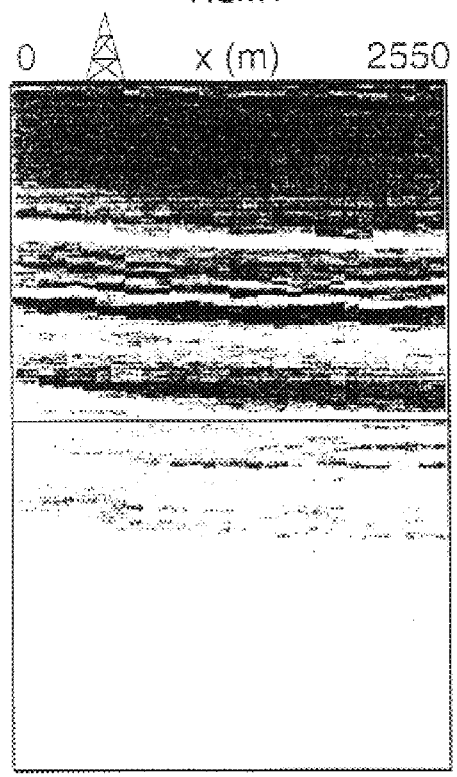
FIGS. 1A and 1B show a cross-section of impedance i intersecting a well after a multiple 2D inversion and a 3D inversion respectively.

As mentioned above, the method first comprises constructing a 3D geometric model comprising several foliated volumes which, in the embodiment example described, are sedimentary units whose sheets are deposition isochrones. An a priori impedance model is then constructed from this geometric model and from a set of impedance measurements taken for example along one or more wells through the zone explored. Implementation of these two stages is described for example in:

Joint EAEG/EAPG/EAGO Multidisciplinary Workshop on "Developing New Reservoirs in Europe", 1994, St Petersburg; Extended Abstracts Book.

An essential stage of the method according to the invention consists in minimizing a global objective function calculated on the entire 3D model by means of a conjugate gradient method. This global objective function consists of two terms. The first one, which is the seismic term, is the square of the norm $L^2$ of the difference between the synthetic data and the observed data. The second one, which is the impedance term, consists on the one hand of the square of the norm $L^2$ of the impedance difference and on the other hand of the square of the norm $L^2$ of the impedance difference gradient, after projection onto the dip plane. This 3D stratigraphic inversion method gives, in a single pass, an optimum 3D impedance block compatible with both the 3D seismic block and the a priori 3D model.

Complete 3D Stratigraphic Inversion

The complete 3D inversion method is based on the following two hypotheses which are commonly used within the scope of reservoir surveys, i.e.

the function which associates the seismic traces with the impedance traces in the time domain is calculated by convolution of a given wavelet with the reflection coefficients of each trace, the geologic structure comprises moderate dips, low-throw faults and low lateral velocity variations.

It is furthermore assumed that the seismic wavelet is constant on the entire 3D block considered and that the noise which distorts the seismic traces is a white noise that is not correlated from one trace to another.

One also considers that the uncertainties relative to the a priori impedance model are modelled by means of a 2D exponential covariance. Many covariance models can be used. Some are simply defined by a variance and a correlation length, but selecting an exponential covariance operator is particularly interesting insofar as the norm associated with the inverse thereof is known and easy to calculate.

The Seismic Objective Function

The seismic objective function measures the difference between each seismic trace and the synthetic trace related thereto:

$$Q_S = \frac{1}{2\sigma_S^2} \sum_{i,j,k} ((R*W)_{ijk} - S_{ijk}^{obs})^2 \tag{1}$$

In this equation, $\sigma_s = S_{RMS}/\rho$ is the uncertainty relative to the seismic amplitude, $S_{RMS}$ being the rms value of the seismic data and $\rho$ the signal-to-noise ratio. R is the trace of the reflection coefficient and W the wavelet obtained after well data and seismic data calibration. $S_{ijk}^{obs}$ is the i-th sample of the j-th trace of the k-th section or line of the 3D seismic block.

The Impedance Objective Function

In each sedimentary unit, one considers that the 2D covariance function along each correlation surface is as follows:

$$\text{cov}(\delta Z(x), \delta Z(y)) = C(x, y) = \sigma^2 \exp\left(-\frac{\|x-y\|}{\lambda}\right) \tag{2}$$

where $\delta Z(x)$ is the impedance difference in relation to the a priori model at location x and $\delta Z(y)$ the corresponding difference at y, $\sigma^2$ being the variance and $\lambda$ the correlation length. The covariance operator is:

$$C: \phi \rightarrow \phi = C(\phi) = \int C(x,y)\hat{\phi}(y) \, dS(y) \tag{3}$$

As it is well-known to specialists, the inverse of this operator is:

$$H: \varphi \rightarrow \varphi = H(\varphi) = \frac{1}{2\pi\sigma^2}\left(\frac{\varphi}{\lambda^2} - \Delta\varphi\right) \tag{4}$$

and the associated norm is:

$$\|\varphi\|^2 c^{-1} = \int \varphi(x)\hat{\varphi}(x) dS(x) \tag{5}$$

$$= \frac{1}{2\pi\sigma^2}\left(\frac{1}{\lambda^2}\int \|\varphi\|^2 dS + \int \|\nabla\varphi\|^2 dS\right) \tag{6}$$

symbols $\Delta, \nabla$ denoting respectively the Laplacian and the gradient.

Whereas 2D inversion implies, as it is well-known, a 1D covariance model along the correlation lines, 3D inversion implies a 2D covariance model along the correlation surfaces (the deposition isochrones) deduced from the stratigraphic and structural interpretation.

Discretization of $\|\phi\|_{c-1}^2$ gives the geologic objective function.

Frequency Content of the Inverted Impedances

The frequencies contained in the a priori model, which are higher than those provided by the seismic bandwidth, are not controlled in the inversion process, which is the reason why they are generally rejected. The post-inversion low-frequency information does not come from the seismic data, but from the a priori impedance model. In many cases, this low-frequency information from wells is of crucial importance as regards prediction of quantitative properties of reservoirs from inverted impedances. Additional low-frequency information such as seismic velocities could thus be used when constructing the a priori impedance model.

Selection of Uncertainty Parameters

The variance $\sigma^2$ measures the variability of the impedance difference in relation to the a priori model, along deposition isochrones. The correlation length $\lambda$ controls the lateral continuity of this impedance difference along stratigraphic surfaces. In practice, a value can be evaluated for each geologic unit either from prior geologic information or from variographic analyses of well impedance values, along deposition isochrones. Their values can also be selected according to the confidence the interpreter has in the a priori model (number of wells, known geologic environment of the wells).

Numerical Results

The effectiveness of the method according to the invention has been compared to that provided by the known multitrace 2D inversion method defined in the aforementioned patent EP-0,354,112, on the basis of data from a 3D seismic block acquired in the North Sea. This block extends over 8 km$^2$ between 2.0 and 2.8 s. The grid pattern consists of 35 lines with 130 traces and 201 time samples, which corresponds to about 900,000 nodes. The sampling intervals are 75 m between the lines, 25 m between the traces and 4 ms in time. Nine impedance logs have been selected for constructing the a priori model.

3D Inversion Compared with Multitrace 2D Inversion

Figure 1B:
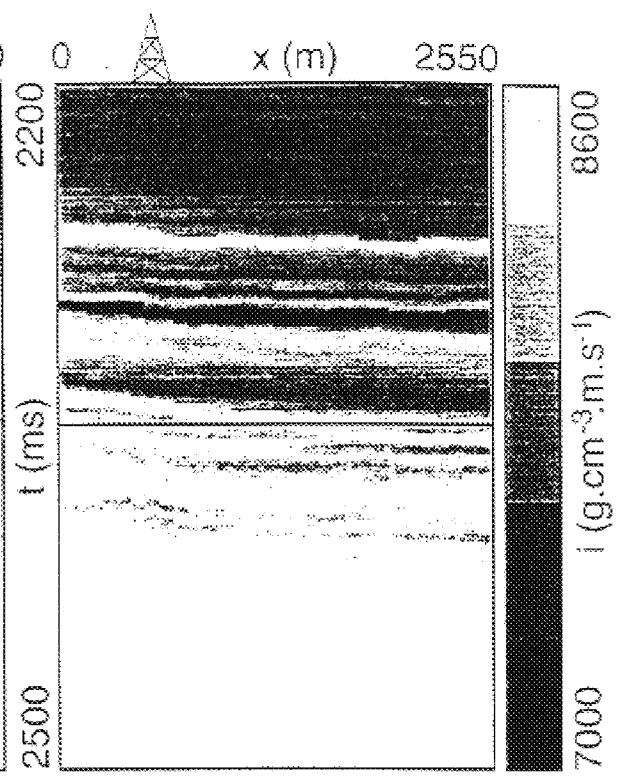
Figure 4:
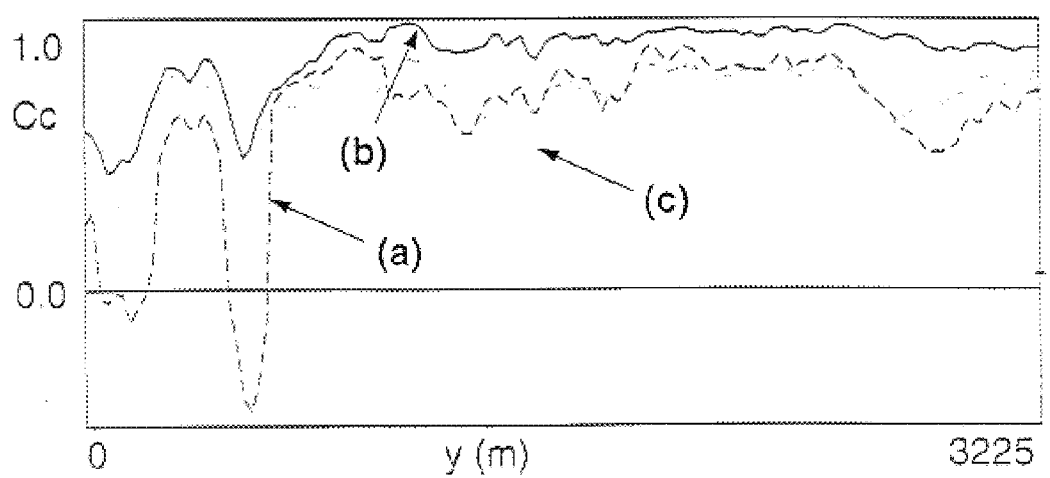
FIG. 4 shows different variation curves (a), (b), (c) of the coefficient of correlation between the reflectivities associated with two adjacent impedance traces, corresponding respectively to the cases shown in FIG. 2, FIG. 3 and to the case shown in FIG. 5 below, the weak correlations on the left side of the figure being due to the presence of faults.
Figure 2:
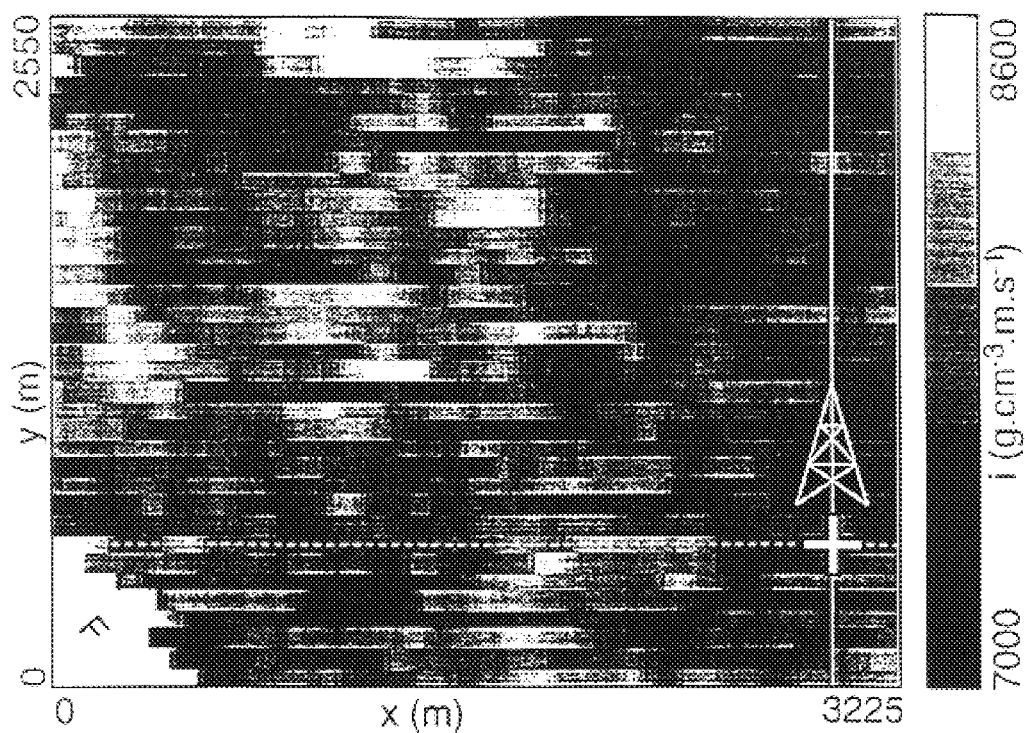
FIG. 2 shows the incoherences between neighboring lines of a section of impedance i which can exist after a multi-2D inversion.
Figure 3:
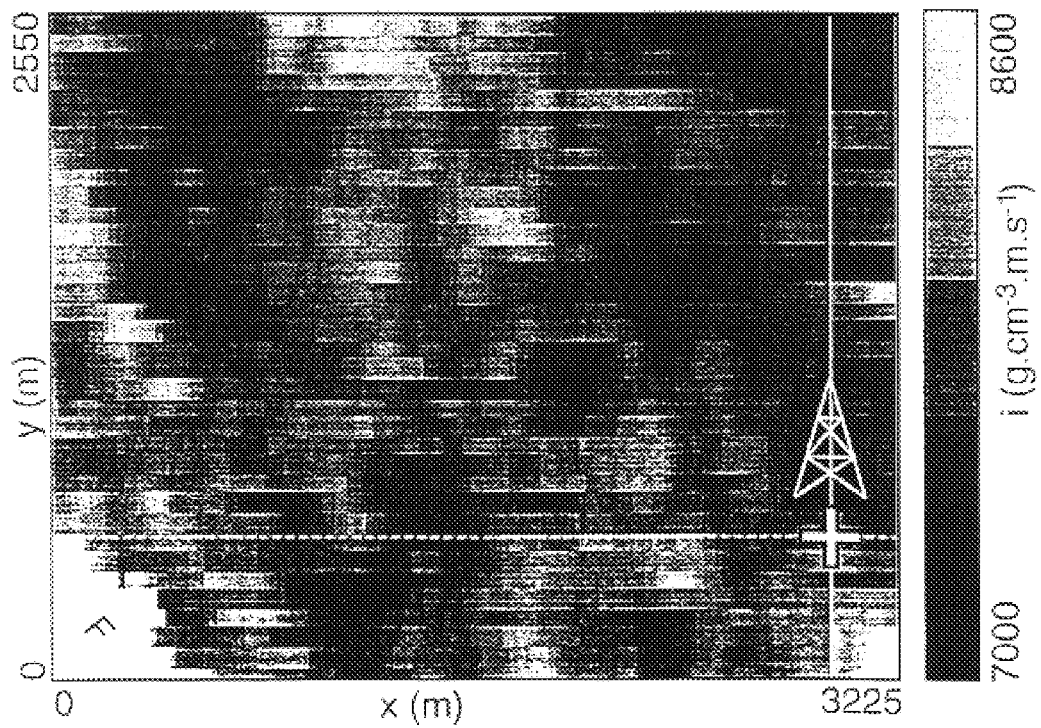
FIG. 3 illustrates how 3D inversion contributes to attenuating the incoherences visible in FIG. 2.

The same a priori 3D model has been used to perform 2D multitrace inversions and 3D inversions on this data set. FIGS. 1A, 1B relative to the cross section across the well (white solid line in FIG. 2) and FIGS. 2 and 3 relative to a horizon slice show the improvement in the continuity along stratigraphic surfaces provided by 3D inversion. F represents here a fault. This observation is confirmed by FIG. 4 where curves (a), (b), (c) represent the coefficient of correlation between the reflectivities associated with the optimum impedance traces of lines 8 (white dotted line in FIG. 2) and 9 and with the same abscissa x, respectively after a multi-2D inversion, after a 3D inversion and after a 3D inversion, the seismic data being favored. For inversions (a) and (b), the parameters are as follows: $\sigma_s$=30%, $\sigma$=250 g.cm$^{-3}$.m.s$^{-1}$ and $\lambda$=500 m, which favours the geologic information.

Effect of the Uncertainty Parameters

Figure 5:
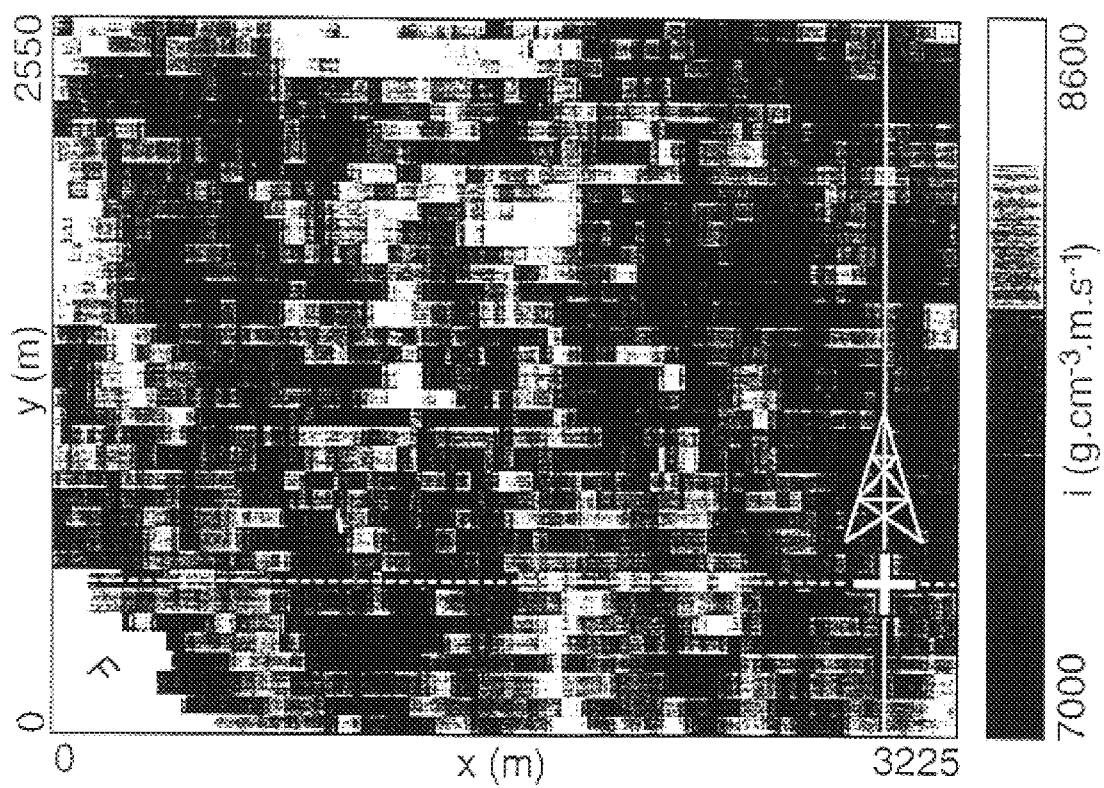
FIG. 5 shows a horizontal section at the base of the block considered after a 3D inversion where the uncertainty parameters have been selected in favor of the seismic information, FIGS. 6A and 6B simultaneously show the inverted impedance traces and the impedance logs obtained in wells.

Another 3D inversion has been performed with uncertainty parameters selected in favor of the seismic data instead of the a priori impedance model ($\sigma_s$=30%, $\sigma$=500 g.cm$^{-3}$.m.s$^{-1}$ and $\lambda$=100 m). The seismic data exhibit a much greater lateral variation than the a priori model along the horizons. Consequently, because of the increased influence of the seismic data, the result shown in FIG. 5 is "rougher" (lateral noise effect) than the result of FIGS. 2 and 3. With parameters favoring seismic data, the lateral continuity of the optimum impedance is low. With parameters favoring geologic information, the lateral continuity is increased only along the lateral axis with a 2D multitrace inversion, and it is increased both along the lateral axis and the longitudinal axis with a 3D inversion.

Figure 6A:
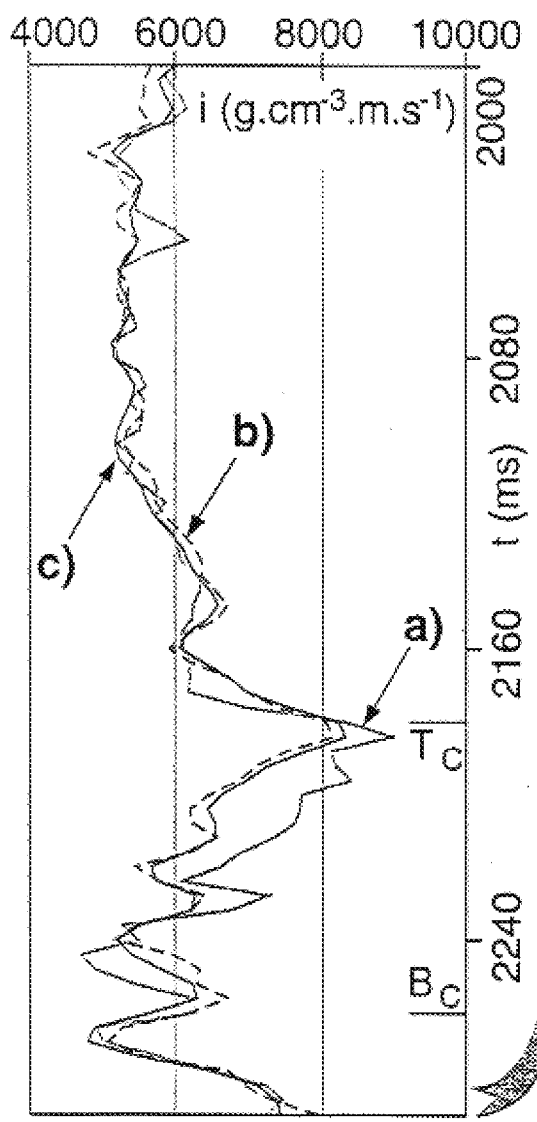
Figure 6B:
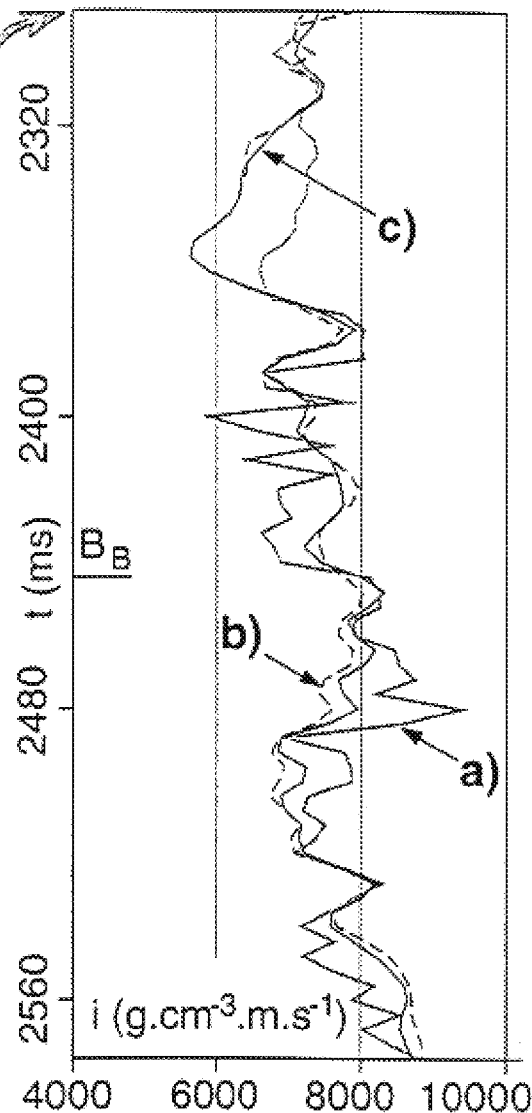

For the results obtained both with multitrace 2D inversion and 3D inversion, the impedance trace at the well location and the impedance trace deduced from well logs have been compared. It can be noted that this well has been used to construct the a priori model. FIGS. 6A and 6B show that the impedance trace obtained after 3D inversion is slightly better than that obtained after multitrace 2D inversion. In this figure, the symbols respectively denote:

Tc, the Cretaceous top,

Bc, the Cretaceous base,

Bb, the Brent base, a), the impedance log, b), the impedance after multi-2D inversion, and c), the impedance after 3D inversion.

Figure 7:
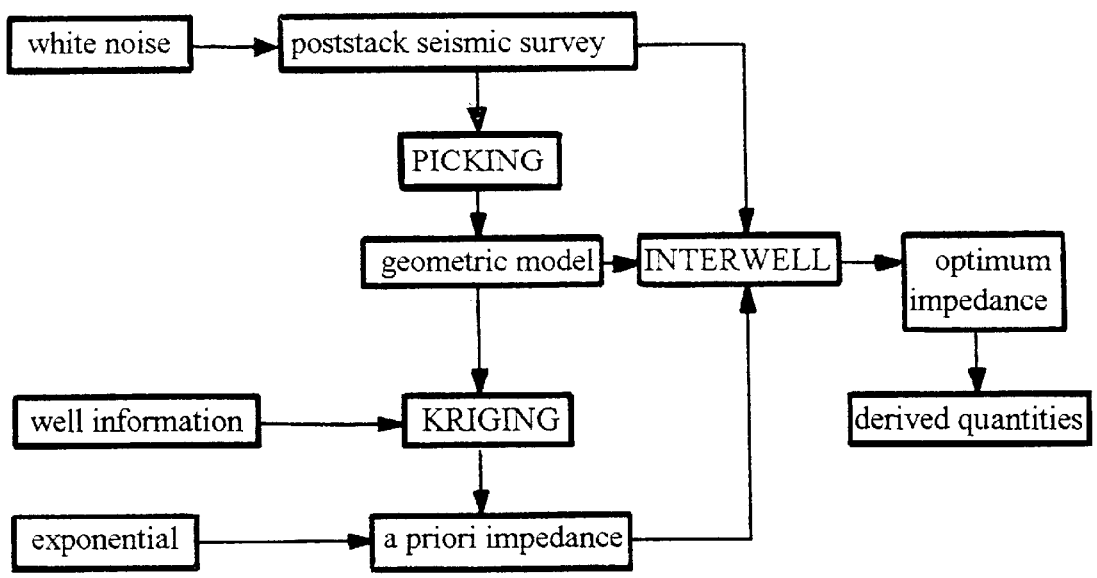
FIG. 7 shows a flowchart illustrating the method according to the invention.

To perform the recorded data inversion stage by using the a priori impedance model, a well-known inversion software can be used, for example the 2D or 3D stratigraphic inversion software INTERWELL® as shown in the flowchart of FIG. 7.

The method according to the invention has been described in an application intended for modelling of the subsoil impedance. It can of course apply to any other physical parameter on the recorded data. More generally, without departing from the scope of the invention, the method according to the invention can be applied to tomographies in very different fields, notably in the field of medical imaging or of non-destructive testing.

What is claimed is:

1. A computer implemented method for forming a three-dimensional (3D) optimum impedance model of a 3D zone of a sub-surface heterogeneous reservoir with respect to seismic waves, the reservoir including foliated volumes with sheets, each sheet being defined from recorded seismic traces corresponding to seismic waves coming from the 3D zone in response to the seismic waves transmitted therein, and after stratigraphic interpretation, comprising:

a) constructing a 3D geometric model comprising the foliated volumes;

b) constructing a priori impedance model from the 3D geometric model and from a plurality of impedance measurements taken at different depths in the zone;

c) forming a global objective function including an impedance function and a seismic function;

d) selecting a covariance model along the sheets of the foliated volumes which models uncertainties about the a priori impedance model to define the impedance of the global objective function for all of the 3D zone;

e) forming the impedance model by a 3D complete inversion of the recorded seismic traces using the a priori impedance model by minimizing the global objective function; and f) using the impedance model formed by a 3D complete inversion for study of the sub-surface reservoir.

2. A method as claimed in claim 1 wherein:

the heterogeneous medium is a subsoil zone, the foliated volumes are sedimentary units, the impedance measurements are obtained at different depths of a well through the zone, and the sheets of the foliated volumes are deposition isochrones in each of these units.

3. A method as claimed in claim 1, comprising:

selecting an isotropic or anisotropic exponential covariance model.

4. A method as claimed in claim 2, comprising:

selecting an isotropic or anisotropic exponential covariance model.

5. A method as claimed in claim 1, wherein:

the seismic function consists of a square of a $L^2$ norm of a difference between synthetic data formed from the a priori impedance model and data corresponding to the recorded seismic traces, and the impedance function consisting of a square of a $L^2$ norm of an impedance difference and of a square of a $L^2$ norm of an impedance difference gradient, after projection of the gradient onto a plane tangential to a local sheet of the foliated volumes.

6. A method as claimed in claim 2, wherein:

the plane tangential to a local sheet of the foliated volumes is a dip plane.

7. A method as claimed in claim 1, comprising: selecting a 2D exponential covariance model.

8. A method as claimed in claim 2, comprising: selecting a 2D exponential covariance model.

9. A method as claimed in claim 3, comprising: selecting a 2D exponential covariance model.

10. A method as claimed in claim 4, comprising: selecting a 2D exponential covariance model.

11. A method as claimed in claim 5, comprising: selecting a 2D exponential covariance model.

12. A method as claimed in claim 6, comprising: selecting a 2D exponential covariance model.

* * * * *